(12) United States Patent
Kohn et al.

(10) Patent No.: US 6,978,417 B1
(45) Date of Patent: Dec. 20, 2005

(54) METHOD AND SYSTEM FOR SUBSETTING RICH MEDIA IN A PEER-TO-PEER MODEL

(75) Inventors: Chi-Shen Jane Kohn, Cupertino, CA (US); Shiau-Shiau Pei, Saratoga, CA (US); Jay William Warfield, San Jose, CA (US); Lawrence S. Hsiung, Los Altos, CA (US); Jerald Thomas Schoudt, Pepperell, MA (US); Jai Prakash Menon, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/564,340

(22) Filed: May 3, 2000

(51) Int. Cl.$^7$ .......................... G06F 17/00; G06F 15/16
(52) U.S. Cl. .............................. 715/500.1; 715/501.1; 715/515; 709/203
(58) Field of Search ......................... 715/500.1, 501.1, 715/514; 707/104.1, 7; 709/203, 217, 206

(56) References Cited

U.S. PATENT DOCUMENTS

| | | | |
|---|---|---|---|
| 5,542,046 A | 7/1996 | Carlson et al. | 395/186 |
| 5,729,682 A | 3/1998 | Marquis et al. | 395/200.12 |
| 5,737,526 A | 4/1998 | Periasamy et al. | 395/200.06 |
| 5,860,073 A * | 1/1999 | Ferrel et al. | 715/522 |
| 5,884,028 A | 3/1999 | Kindell et al. | 395/200.09 |
| 5,913,028 A | 6/1999 | Wang et al. | 395/200.33 |
| 5,953,538 A | 9/1999 | Duncan et al. | 395/842 |
| 5,960,404 A | 9/1999 | Chaar et al. | 705/8 |
| 6,023,714 A * | 2/2000 | Hill et al. | 715/513 |
| 6,094,684 A * | 7/2000 | Pallmann | 709/227 |
| 6,282,549 B1 * | 8/2001 | Hoffert et al. | 707/104.1 |
| 6,377,962 B1 * | 4/2002 | Tindell et al. | 715/515 |
| 6,539,430 B1 * | 3/2003 | Humes | 709/225 |
| 6,557,042 B1 * | 4/2003 | He et al. | 709/231 |
| 6,640,249 B1 * | 10/2003 | Bowman-Amuah | 709/228 |
| 6,701,350 B1 * | 3/2004 | Mitchell | 709/217 |

OTHER PUBLICATIONS

Microsoft Press Computer Dictionary, 1997, Third Edition, pp. 370.*
Spyglass Prism, 1997, Spyglass Inc, pp. 1-8.*

* cited by examiner

Primary Examiner—Stephen Hong
Assistant Examiner—Adam L. Basehoar
(74) Attorney, Agent, or Firm—Gregory M. Doudnikoff; Yee & Associates, P.C.

(57) ABSTRACT

A method and system for sending rich media. In a preferred embodiment, a document containing rich media is parsed using preset filtering options to determine a subset of the document containing rich media that is intended to be sent to a recipient. The document containing rich media and filtering instructions are then sent to a document server. The filtering instructions instruct the document server as to the identity of the subset of the document containing rich media. The entire document containing rich media is stored on the document server, but only the subset of the rich media is copied and sent to an intended recipient.

3 Claims, 9 Drawing Sheets

100
Network

300
Client

Client Component Architecture
500

METHOD AND SYSTEM FOR SUBSETTING RICH MEDIA IN A PEER-TO-PEER MODEL

BACKGROUND OF THE INVENTION

1. Technical Field

The present invention relates generally to the field of computer software and, more particularly, to methods of providing rich media in a peer-to-peer model.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Another aspect of the Internet that is becoming increasingly important for businesses to communicate internally and with customers and other businesses is the use of electronic mail (e-mail). E-mail is being used more and more to share documents such that multiple parties can access and sometimes edit a document to produce a high quality product. Furthermore, e-mail is used to provide advertising and other forms of persuasive communication. However, text and graphics are oftentimes inadequate to adequately express ideas and to persuade people. Thus, the need for multi-media or rich media documents.

However, with the increasing speed and sophistication of computers, documents containing more than text and graphics are now routinely shared over the Internet or other network through e-mail. As mentioned above, these types of documents are often referred to as rich media documents. Rich media generally refers to documents or that can include video, audio, animation, fill-in forms, pull-down menus, and other files that are larger than traditional text and/or graphics documents. Rich media has been a growing category for providing information to users, but its use has been hampered by bandwidth constraints. Most rich media, particularly audio and video, require greater bandwidth to be effective. Thus, when being sent across the network, large amounts of bandwidth are consumed, which slows down the speed and efficiency of the network. Furthermore, the entire multi-media document must be stored at each recipients computer. Thus, using up valuable storage space on each recipients computer. However, many times, a recipient does not need the entire multimedia document to reap the information desired to be transmitted by the sender. Therefore, a method and system of reducing network bandwidth required to send rich media documents is desirable. Furthermore, a method and system of reducing storage requirements on the computers of recipients of rich media is also desirable.

SUMMARY OF THE INVENTION

The present invention provides a method and system for sending rich media. In a preferred embodiment, a document containing rich media is parsed using preset filtering options to determine a subset of the document containing rich media that is intended to be sent to a recipient. The document containing rich media and filtering instructions are then sent to a document server. The filtering instructions instruct the document server as to the identity of the subset of the document containing rich media. The entire document containing rich media is stored on the document server, but only the subset of the rich media is copied and sent to an intended recipient.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
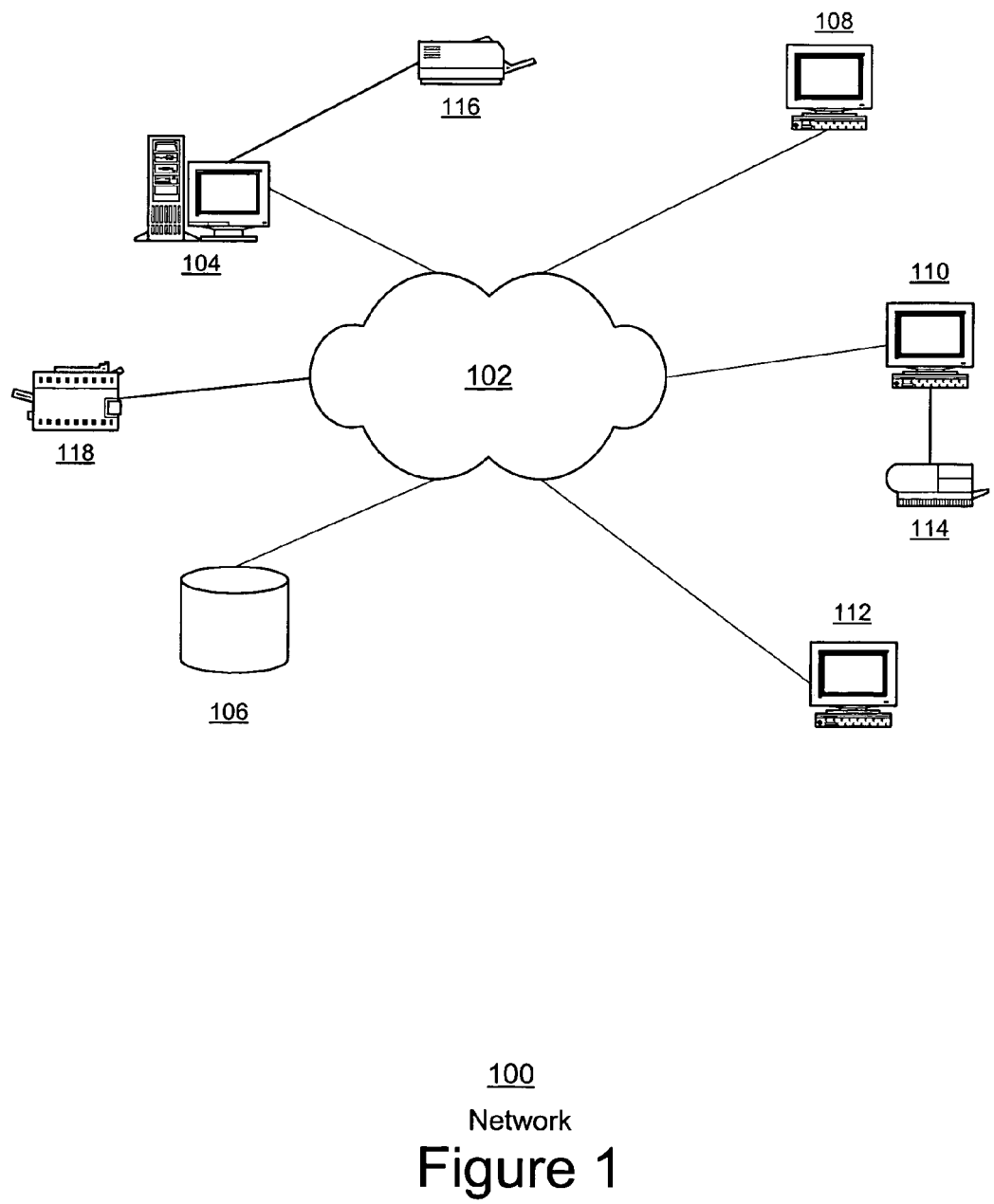
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, document server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images and applications, to clients 108–112. Clients 108, 110 and 112 are clients to document server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention. As depicted in FIG. 1, clients 108, 110, and 112 are peers with each other. Also, as used herein, identical reference numerals in different figures refer to the same or similar features.

Figure 2:
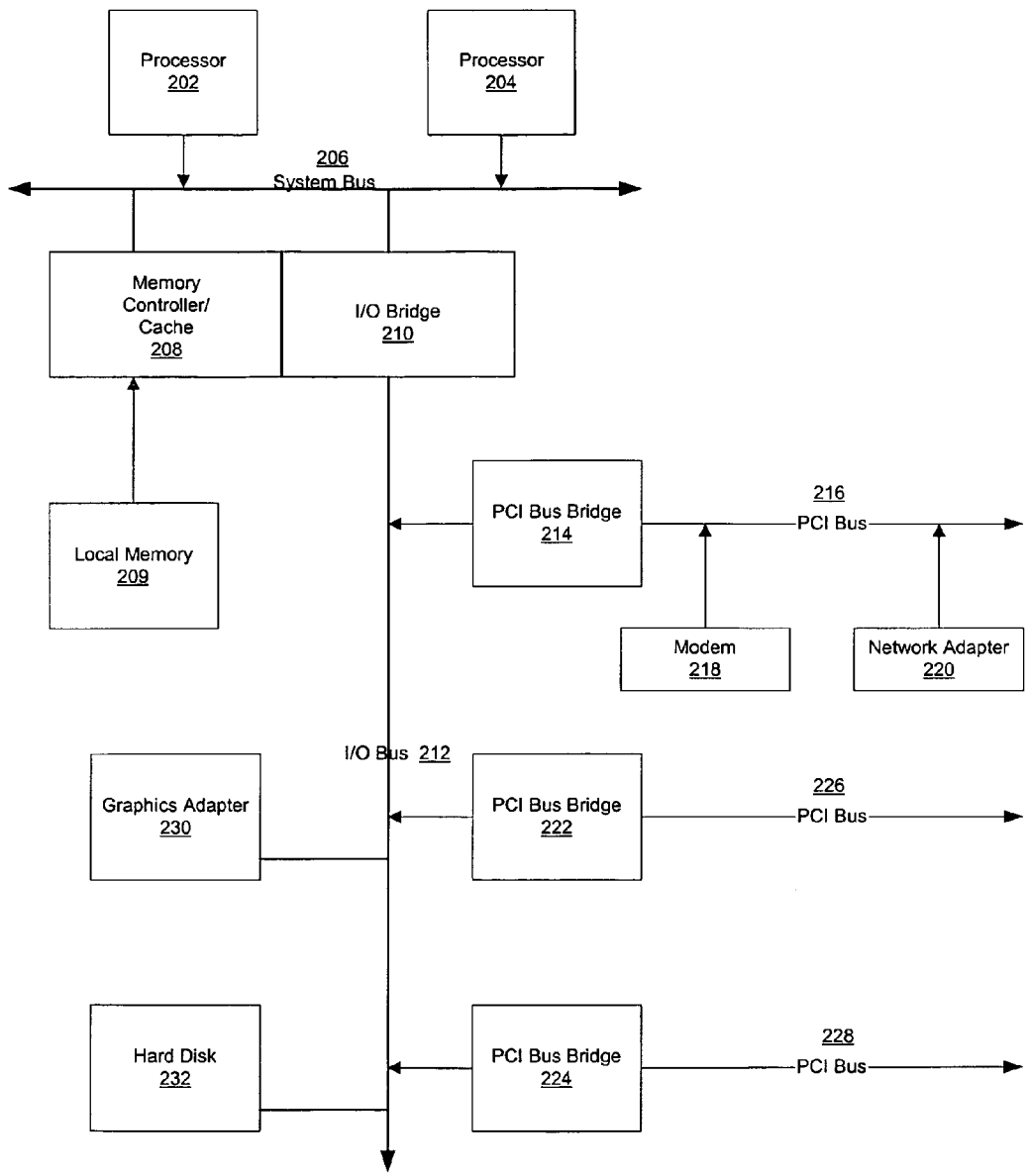
FIG. 2 depicts a block diagram of a data processing system which may be implemented as a server in accordance with the present invention.

Referring to FIG. 2, a block diagram of a data processing system which may be implemented as a server, such as document server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems and network adapters 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
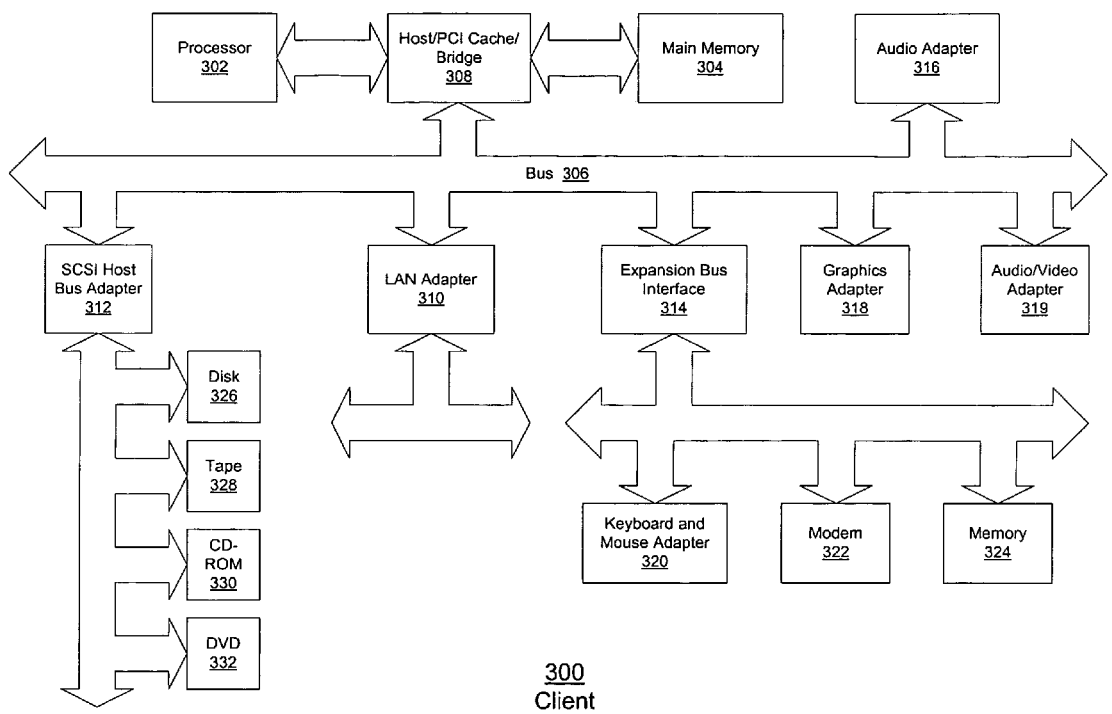
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
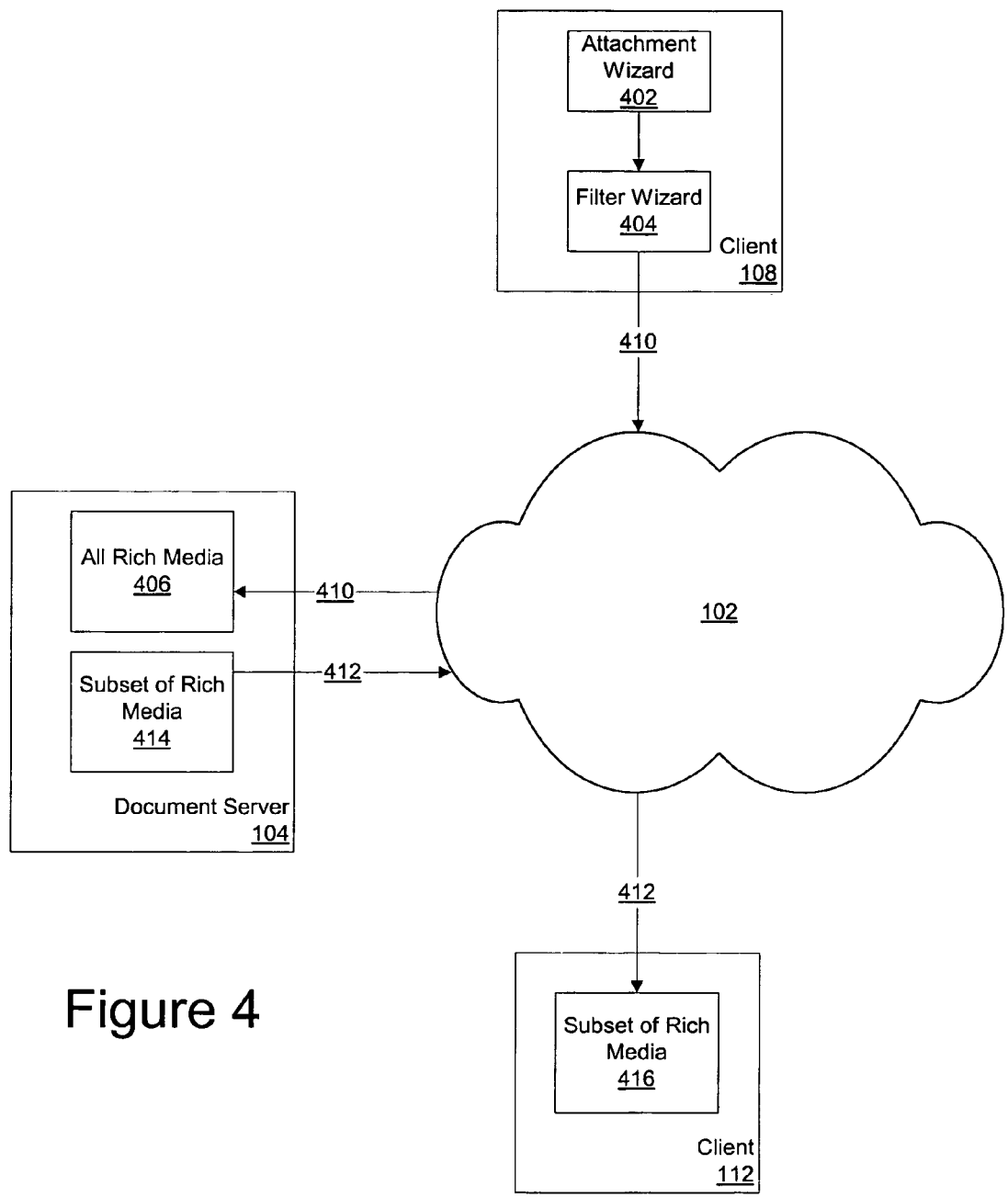
FIG. 4 depicts a block diagram illustrating a preferred method of filtering rich media to include only a desired subset of the rich media for copying by an intended peer recipient in accordance with a preferred embodiment of the present invention.

Referring now to FIG. 4, a block diagram illustrating a preferred method of filtering rich media to include only a desired subset of the rich media for copying by an intended peer recipient is depicted in accordance with a preferred embodiment of the present invention. As used herein, rich media refers to a multimedia document that may include, for example, text, graphics, audio and video. The document containing rich media may also include hyperlinks, which, when selected, bring up, for example, a new multimedia document or start a video player. The rich media may also include media players made up of player components which each have a dependence on class loads. As used herein, the term "document containing rich media" may refer to a document containing one or more rich media files and one or more rich media players and may also include multiple types of rich media files and players.

Consider now a user of client 108. Suppose the user wishes to send a document containing rich media to the user at client 112. Attachment wizard 402 attaches the document containing rich media to an e-mail to send to client 112. Suppose the document containing rich media is several layers deep (i.e., hyperlinks in the first layer to media in a second layer with hyperlinks in the second layer to media in a third layer and so on), but that the user of client 108 only wishes to send the first two layers to the user at client 112. The user of client 108 configures the filter wizard 404 to filter out all media documents and players that are not used in the one of the first two layers of the document containing rich media.

Filter wizard 404 parses the document containing rich media and determines which media files and players are needed for a user to access the media contained within the first two layers of the document containing rich media. Client 108 then sends filter data 410 to document server 104 via network 102. Filter data 410 includes the entire document containing rich media including all layers, not just the first two layers. Filter data 410 also includes all players necessary for presenting the rich media to a user as well as filter information instructing document server 104 as to which files and players to copy to client 112.

All rich media 406 is then stored on document server 104. All rich media 406 includes all rich media files, players and filter information that was sent from client 108 via filter data transmission 410. Upon a request to retrieve mail from client 112, document server selects the appropriate subset of rich media files and players 414 based upon the instructions in the filter data received from client 108 and sends filtered data transmission 412 to client 112 via network 102. Client 112 receives filtered data transmission 412 and presents the subset of rich media 416 to the user or stores it for later presentation. However, should the user of client 112 wish to access the rich media files contained more than two layers deep in the document, the user can do so by retrieving the appropriate files from the document server 104. This function is possible because all levels of the document containing rich media are stored on document server 104.

Thus, storage requirements on client 112 are reduced since only a subset of the rich media is sent to client 112. Furthermore, since only a subset of the rich media is sent, network transmissions are improved because of fewer data bytes being transmitted over network 102.

Although depicted with reference to a single recipient of the document containing rich media, multiple recipients could also be specified. In such case, the savings in network bandwidth by sending only a portion of the rich media to each client over sending the whole document containing rich media to each client is even greater than is the savings achieved by the present invention when sending a portion of the document containing rich media to a single client.

Furthermore, if multiple recipients are intended, the user of client 108 may configure the filter such that each recipient receives a different portion or different amount of the rich media. For example, the user of client 108 may believe that a first recipient needs to access only the first level of the document containing rich media while a second recipient needs to access three levels of the document containing rich media. Thus, the user of client 108 may configure the filter wizard to send multiple filtering options to document server 104 wherein each recipient receives a different filtered version of the document containing rich media.

In another embodiment of the present invention, rather than filtering the document containing rich media based upon which layer of the document the rich media is contained, the document containing rich media may be filtered based upon the type of content. For example, the user of client 108 may wish to send a first recipient only the video and audio files and players, but may wish to send a second recipient only the graphics and text portion of the document containing rich media. Such an allocation may be useful if one party has responsibility for creating and editing one part of a document containing rich media while a different party has responsibility for a second part of the document containing rich media where neither party needs access to the other parties portion of the rich media to accomplish its function.

Figure 5A:
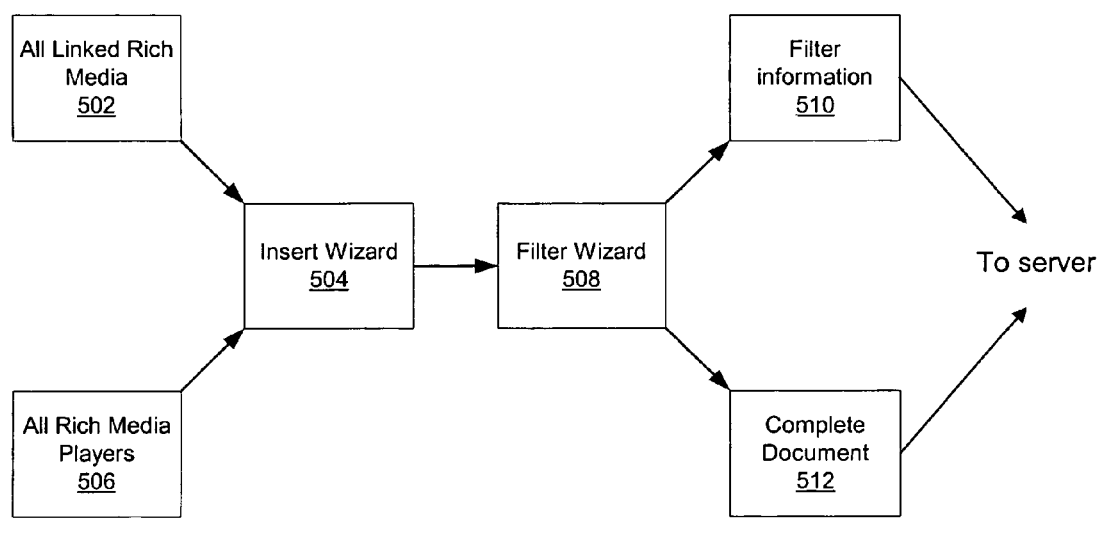
FIG. 5A depicts a block diagram of the client component architecture for determining a subset of rich media to include in delivery to a recipient in accordance with the present invention.

Referring now to FIG. 5A, a block diagram of the client component architecture 500 for determining a subset of rich media to include in delivery to a recipient is depicted in accordance with the present invention. When a user wishes to attach a document containing rich media to an e-mail for delivery to a recipient, insert wizard 504 determines all linked rich media files 502 associated with the document containing rich media and inserts them into the e-mail. Insert wizard 504 also determines and inserts all rich media players 506 needed to display or access all of the inserted rich media files 502. The entire document including all inserted rich media and rich media players is then sent to filter wizard 508.

Filter wizard 508 then determines, based on user preset options, which rich media files to include in the subset of all rich media 502 and which rich media players to include in the subset of all rich media players 506. For example, if the user's preset options specified that only the first two layers of the rich media be sent to the recipient, then filter wizard, would determine which of all linked rich media 502 should be included in the subset of all rich media 502. Although when the complete rich media is initially inserted, more than one player may be required for all of the rich media files selected, when the rich media data components are subsetted, there is now the possibility that fewer players are required, thereby allowing the subsetting of the player components to include only the required player components. Thus, filter wizard 508 also parses the subsetted rich media to determine which subset of all rich media players 506 to copy to the recipient.

Once filter wizard 508 has determined the subset of all rich media 502 and subset of all rich media players 506, the entire document 512, including all linked rich media 502 and all rich media players 506, is sent to the document server along with filtering information 510 containing instructions about the identity of the subset of all rich media 502 and the subset of rich media players 506 that are to be copied to the intended recipient. Thus, all layers of the rich media are contained on the document server, but only those components of the rich media and players are copied from the document server to the recipient, thereby saving network bandwidth and storage space on the intended recipients machine.

As discussed above, the filtering preferences may be based on, for example, number of layers of the rich document or the type of rich media to include and may also be recipient dependent. However, these examples of methods of filtering are not exhaustive and other methods of filtering may be used as well without departing from the scope and spirit of the present invention.

Figure 5B:
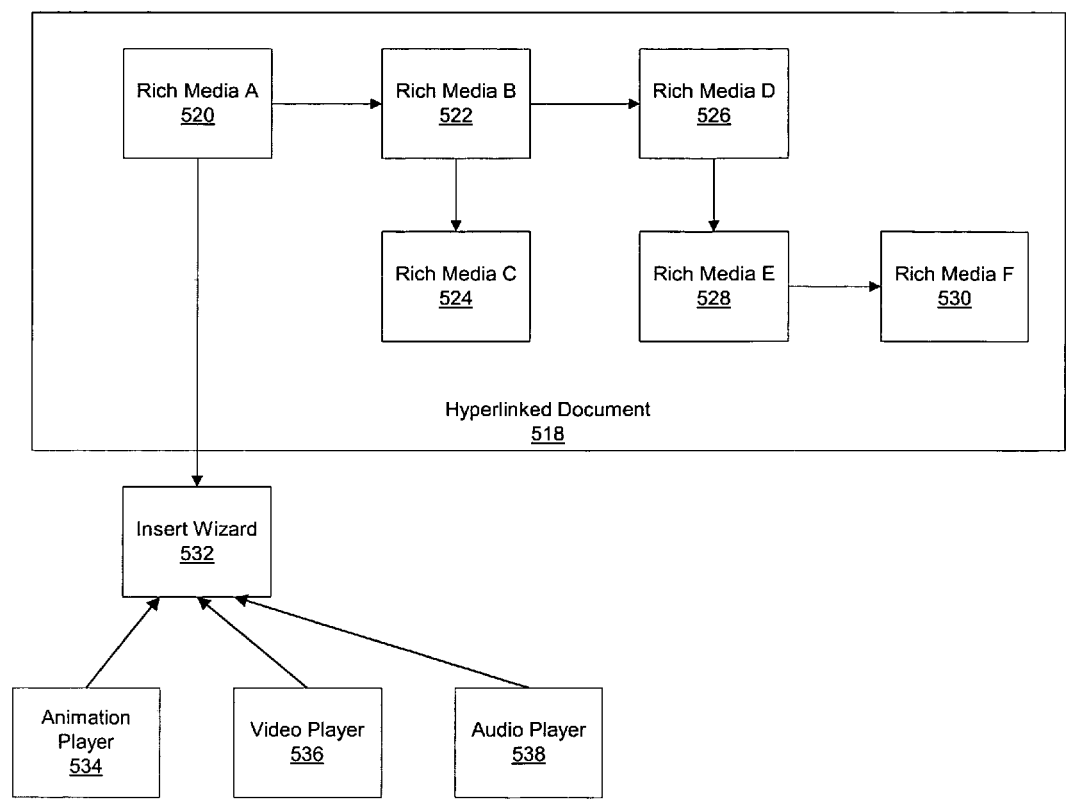
FIG. 5B depicts a block diagram illustrating an example of a hyperlinked document containing multiple linked pages and rich media in accordance with the present invention.

Referring now to FIG. 5B, a block diagram illustrating an example of a hyperlinked document 518 containing multiple linked pages and rich media is depicted in accordance with the present invention. In this example, hyperlinked document 518 contains rich media A 520 contains a hyperlink (a preset connection that, when selected, retrieves another page or document) to rich media B 522. Rich media B 522 contains hyperlinks to rich media C 524 and rich media D 526, which in turn contains hyperlinks to rich media E 528. Rich media E 528 contains a hyperlink to rich media F 530. Insert wizard 532, besides inserting all rich media files, also inserts all rich media players 534–538 needed for hyperlinked document 518. Each of pages 520–530 may require one or more of the rich media players 534–538. Furthermore, some of rich media pages 520–530 may require fewer of rich media players 534–536 than others of rich media pages 520–530. Thus, hyperlinked document 518 is a document containing a plurality of linked pages 520–530. Each of rich media A–F 520–530 may be, for example, contained in a document or page such as a web page that might be viewed by a web browser. Furthermore, more, fewer, or different rich media players could be included, the rich media players described are merely examples and are not meant to imply any architectural limitations.

Figure 5C:
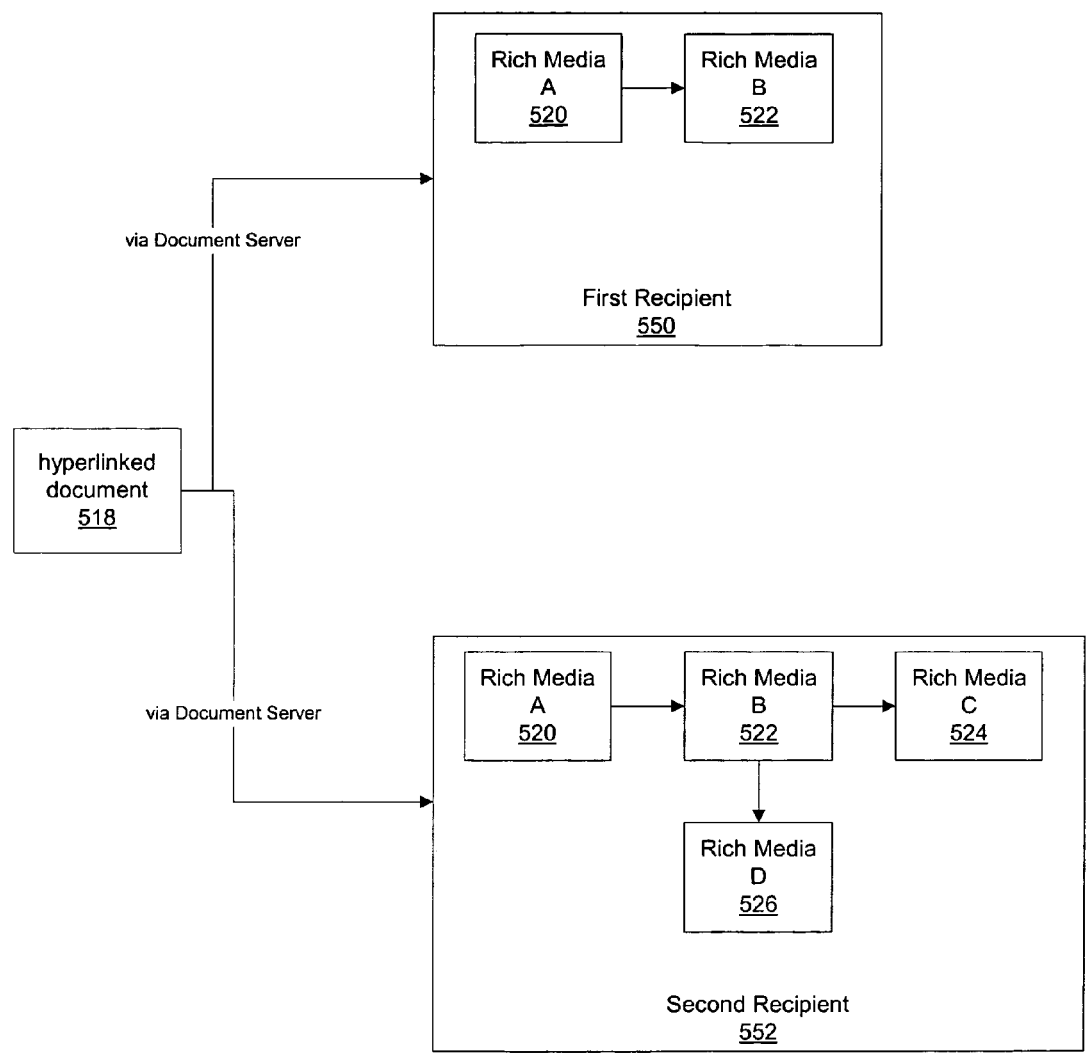
FIG. 5C depicts a block diagram illustrating different recipients receiving different subsets of a hyperlinked document when the filter wizard is utilized according to the present invention.

Therefore, referring to FIG. 5C, which illustrates different recipients receiving different subsets of hyperlinked document 518, when the filter wizard is utilized, one subset of document 518 may be sent to a first recipient 550 and a different subset of document 518 may be sent to a second recipient 552 based on a users configuration of the filter wizard. Thus, if the user determines that the first recipient 550 needs access to only rich media pages 520 and 522 while the second recipient 552 needs access to rich media pages 520–526, the filter wizard may create instructions for the document server to deliver only the relevant parts of hyperlinked document 518 to ensure that each recipient receives only the part of hyperlinked document 518 needed. Thus, a reduction in network traffic is achieved and a savings in storage requirements is achieved since each of recipients 550 and 552 receive and store only a subset of hyperlinked document 518.

Figure 6:
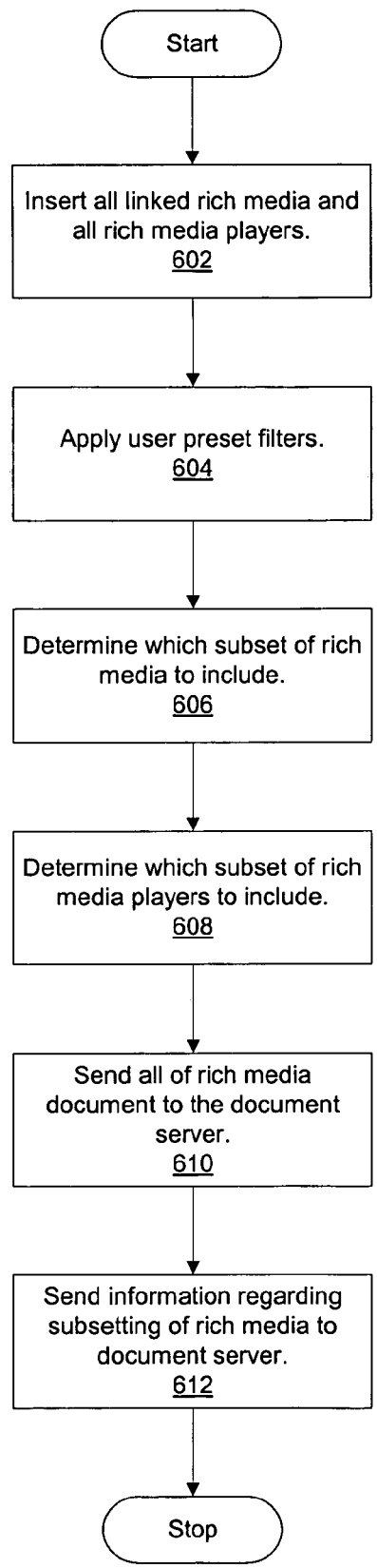
FIG. 6 depicts a flowchart illustrating an exemplary method of implementing the filter wizard on a client in accordance with the present invention.

With reference now to FIG. 6, a flowchart illustrating an exemplary method of implementing the filter wizard on a client is depicted in accordance with the present invention. In response to user input, all linked rich media data components and all rich media player components are inserted into the e-mail document for delivery to the intended recipient (step 602). The filter wizard then determines and applies the user preset filters (step 604). The user may enter these preset filters through the use, for example, of a graphical user interface (GUI).

The filter wizard then automatically determines which subset of rich media data components from the group of all rich media data components contained within the document containing rich media need to be included based on the user's preset filter options (step 606). Next, the filter wizard determines which subset of the rich media player components need to be included in order to present the selected subsetted rich media data components to the intended recipient (step 608). The entire document containing rich media including all rich media data components and all rich media player components are then sent to the document server (step 610). The filter wizard also sends the information regarding which subset of rich media data components and rich media player components should be copied by the document server to the recipient peer (step 612). It should be noted that steps 610 and 612 may be implemented simultaneously or in reverse order to that illustrated herein.

Figure 7:
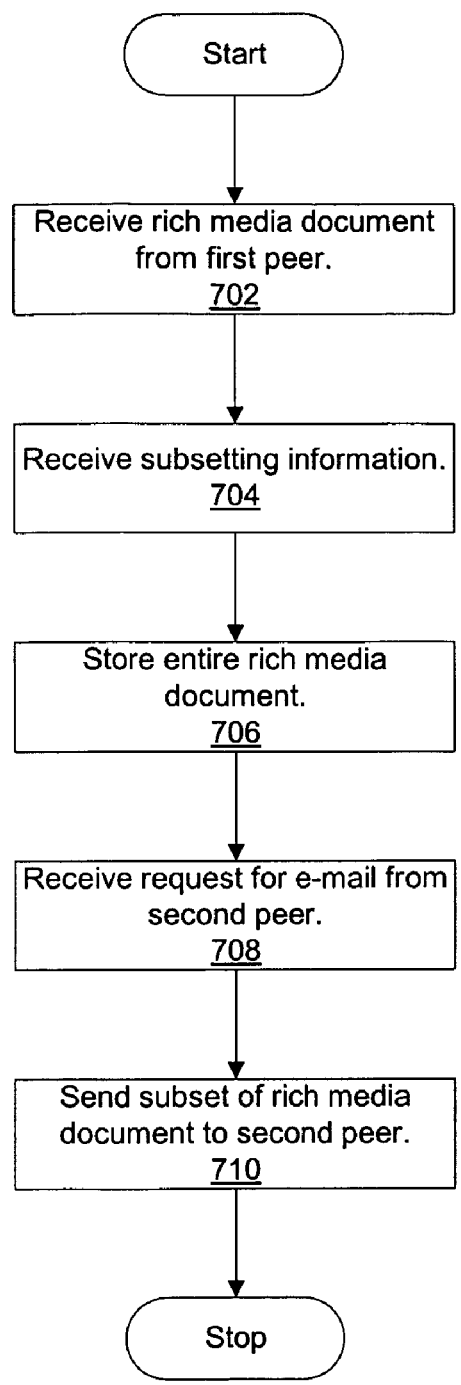
FIG. 7 depicts a flowchart illustrating the process of receiving, storing, and sending the subset rich media performed on a document server in accordance with the present invention.

Referring now to FIG. 7, a flowchart illustrating the process of receiving, storing, and sending the subset rich media performed on a document server is depicted in accordance with the present invention. First, the document server receives the entire document containing rich media from the first peer (sending client) (step 702). The entire document containing rich media includes all of the rich media data components as well as all of the rich media player components. Next, the document server receives the filtering subsetting information from the first peer (step 704). The filtering subsetting information includes the information regarding which rich media data components and player components to copy to the recipient.

The entire document containing rich media is then stored on the document server (step 706). Next, when a request for new e-mail is received from the second peer (the recipient) (step 708), the document server identifies the subset of rich media indicated by the filtering subsetting information and sends the subset of rich media to the second peer (step 710). However, the entire document containing rich media remains stored on the document server where the second peer may access it if the second peer so chooses.

Although the present invention has been described primarily in the context of an electronic mail (e-mail) system, it will be apparent to one skilled in the art that the present invention may be applied to other document systems as well. For example, in Lotus Notes, a product of International Business Machines Corporation, a database can be an e-mail database or a document database that contains items such as, for example, forums and discussions. The Lotus Notes database on a server becomes the document server of the present invention. Thus, the user creating rich media in a document can create the rich media in a forum or discussion database and users of that database might be notified automatically that the database has been updated. Thus, using the filtering mechanism of the present invention, different users may retrieve different aspects of the document depending on the filtering options selected by the user that created the document.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of sending rich media, comprising the steps of:
   parsing a document containing rich media using preset filtering options to determine a subset of the document containing rich media; and
   sending the document containing rich media and filtering instructions to a document server, wherein the filtering instructions instruct the document server as to the identity of the subset of the document containing rich media;
   wherein the rich media comprises multiple layers of data connected by a plurality of hyperlinks, multiple rich media players, and said preset filtering options comprise a selection of a number of layers less than the total number of multiple layers and further comprising:
   determining a subset of rich media players to include with the subset of rich media based on the rich media players needed to present the selected layers of the rich media.

2. A computer program product tangibly embodied in a computer readable media for use in a data processing system for sending rich media, the computer program product comprising:
   first instructions for parsing a document containing rich media using preset filtering options to determine a subset of the document containing rich media; and
   second instructions for sending the document containing rich media and filtering instructions to a document server, wherein the filtering instructions instruct the document server as to the identity of the subset of the document containing rich media,
   wherein the rich media comprises multiple layers of data connected by a plurality of hyperlinks, multiple rich media players, and said preset filtering options comprise a selection of a number of layers less than the total number of multiple layers and further comprising:
   third instructions for determining a subset of rich media players to include with the subset of rich media based on the rich media players needed to present the selected layers of the rich media.

3. A system for sending rich media, comprising:
   means for parsing a document containing rich media using preset filtering options to determine a subset of the document containing rich media; and
   means for sending the document containing rich media and filtering instructions to a document server, wherein the filtering instructions instruct the document server as to the identity of the subset of the document containing rich media;
   wherein the rich media comprises multiple layers of data connected by a plurality of hyperlinks, multiple rich media players, and said preset filtering options comprise a selection of a number of layers less than the total number of multiple layers and further comprising:
   means for determining a subset of rich media players to include with the subset of rich media based on the rich media players needed to present the selected layers of the rich media.

* * * * *